United States Patent Office 3,810,827
Patented May 14, 1974

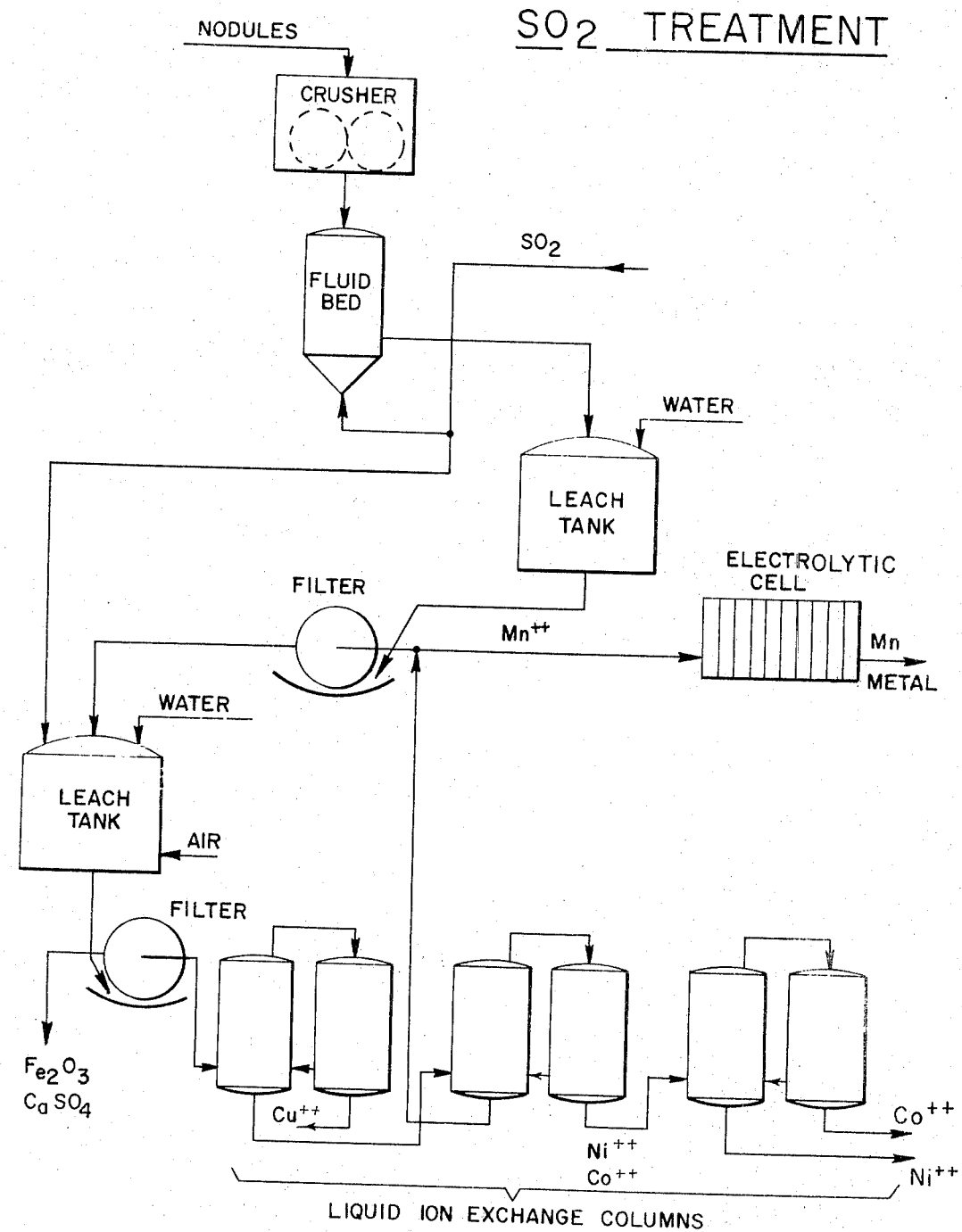

3,810,827
METHOD FOR SEPARATING METAL VALUES FROM OCEAN FLOOR NODULE ORE
William S. Kane, Wicomic, and Paul H. Cardwell, Zanoni, Va., assignors to Deepsea Ventures, Inc.
Continuation-in-part of abandoned application Ser. No. 251,089, May 8, 1972, which is a continuation of application Ser. No. 40,586, May 26, 1970. This application Nov. 27, 1972, Ser. No. 309,713
Int. Cl. C22d 1/24, 1/14, 1/16
U.S. Cl. 204—105 M    14 Claims

ABSTRACT OF THE DISCLOSURE

This invention provides a process for obtaining the metal values from ocean floor nodule ore. The ore comprises primarily oxides of iron and manganese plus nickel, copper and cobalt compounds. The ore is treated with an acidic reagent, e.g., $SO_2$, in the absence of oxygen, to form the water-soluble salt, e.g., the sulfate, of manganese, only. The ore is then leached with water to obtain a solution of the manganese salt, which may be further treated to obtain manganese metal. The ore residue can be further treated to extract the other metal values.

---

This application is a continuation-in-part of a co-pending U.S. patent application Ser. No. 251,089 filed on May 8, 1972, now abandoned, which is a continuation of U.S. patent application Ser. No. 40,586, filed May 26, 1970.

It is not a common situation to obtain a relatively valuable nonferrous metal such as nickel, cobalt, copper, manganese, titanium, indium and zinc, from minerals which contain a relatively high proportion of iron. A relatively untapped source of high-quality manganiferous ore, however, in a material which is found on the ocean floor and has come to be known as ocean floor nodule ore.

With the increased awareness on the part of both the public and the metals industry of the ecological dangers that can arise from continued surface mining of minerals and the increased problems of pollution caused by the refining procedures required for most ores mined from the land, industry has been interested for several years now in the mining of minerals from the sea. This has been an extremely elusive target up to the present. The directions taken have included both attempts to wrest minerals directly from solution in sea water and the mining of ores which are available on the floor of the ocean. These ores do not require any digging into or stripping of the earth's crust; the ocean floor ores can merely be scooped up or in other ways removed from the ocean floor without actually rending the earth's surface.

Ocean floor nodules were first collected in the first half of the 1870's. They have been studied by many workers in an attempt to determine their composition, and after their composition had been determined to try to decipher ways to wrest from their peculiar structure the valuable metals contained therein. It is presently believed that these nodules are actually creations of the sea; they are somehow grown from the metal compounds which are dissolved in sea water, generally in the form of the metal oxides.

The metal values in the nodules are almost exclusively in the form of the oxides and moreover are present in a very peculiar physical configuration. The physical and chemical structure of the nodules are believed to be a direct result of the conditions under which they were created and to which they have been exposed since their creation. First, the nodules have never been exposed to tempertures other than those at the bottom of the ocean at the location at which they were formed. They have an extremely large surface area, often better than 50% porosity and they are thus relatively chemically reactive ores.

The nodules are formed as an extremely complex crystal matrix of iron and manganese oxides: tiny grains of each oxide of a size and type which are substantially impossible to separate with present available physical means. These iron and manganese oxides form the crystalline structure within which are held, by means not precisely known, other metal compounds, most likely oxides, including those of nickel, copper and cobalt, as the main ingredients, followed by chromium, zinc, tin, vanadium, and many more elements, including the rate metals silver and gold.

In addition to the crystals of compounds of the valuable metals present, there is also a large quantity of silt, or gangue material intimately admixed in the nodule ore. This silt, or gangue, is sand and clay, and includes the usual oxides of silicon and aluminum in varying proportions and some carbonates, especially calcium carbonate.

The precise chemical composition of the nodules varies depending upon their location in the ocean. The variation apparently is caused by differences in temperature in various places, differences in composition of sea water perhaps caused by the pressure and temperature variations at different depths and composition of adjacent land areas, variations in the amount of oxygen which is present in the water in different locations and perhaps other variables not readily apparent to observers. Generally, however, in almost all cases the metals which are present in primary proportions are manganese and iron. The following table (taken from an article entitled "The Geochemistry of Manganese Modules and Associated Deposits from the Pacific and Indian Oceans" by Croonan and Tooms in Deep Sea Research (1969)), volume 16, pages 335–359, Pergamon Press (Great Britain) shows the relative compositions of the most valuable metals contained in nodules taken from different areas within the Pacific and Indian Oceans.

TABLE I

|  | 1 | 2 | 3 | 4 | 5 | 6 | 7 | 8 | 9 |
|---|---|---|---|---|---|---|---|---|---|
| Mn | 13.96 | 16.87 | 15.71 | 15.85 | 22.33 | 19.31 | 16.61 | 13.56 | 15.83 |
| Fe | 13.10 | 13.30 | 9.06 | 12.22 | 9.44 | 10.20 | 13.92 | 15.75 | 11.31 |
| Ni | 0.393 | 0.564 | 0.956 | 0.348 | 1.080 | 0.961 | 0.433 | 0.322 | 0.512 |
| Co | 1.127 | 0.395 | 0.213 | 0.514 | 0.192 | 0.164 | 0.595 | 0.358 | 0.153 |
| Cu | 0.061 | 0.393 | 0.711 | 0.077 | 0.627 | 0.311 | 0.185 | 0.102 | 0.330 |
| Pb | 0.174 | 0.034 | 0.049 | 0.035 | 0.028 | 0.030 | 0.073 | 0.061 | 0.034 |
| Ba | 0.274 | 0.152 | 0.155 | 0.306 | 0.381 | 0.145 | 0.230 | 0.146 | 0.155 |
| Mo | 0.042 | 0.037 | 0.041 | 0 040 | 0 047 | 0.037 | 0 035 | 0.029 | 0.031 |
| Y | 0.054 | 0.044 | 0.036 | 0.065 | 0.041 | 0.031 | 0.050 | 0.051 | 0.040 |
| Cr | 0.0011 | 0.0007 | 0.0012 | 0.0051 | 0.0007 | 0.0005 | 0.0007 | 0.0020 | 0.0009 |
| Ti | 0.773 | 0.810 | 0.561 | 0.489 | 0.425 | 0.467 | 1.007 | 0.820 | 0.582 |
| L.O.I | 30.87 | 25.50 | 22.12 | 24.73 | 24.75 | 27.21 | 28.73 | 25.89 | 27.18 |
| Depth (m.) | 1,757 | 5,001 | 5,049 | 1,146 | 4,537 | 4,324 | 3,539 | 3,793 | 5,046 |

NOTE.—1=Mid-Pacific Mountains (5 samples); 2=West Pacific (23 samples); 3=Central Pacific (9 samples); 4=Southern Borderland Seamount Province (5 samples); 5=Northeast Pacific (10 samples); 6=Southeast Pacific (8 samples); 7=South Pacific (11 samples); 8=West Indian Ocean (10 samples); 9=East Indian Ocean (14 samples).

Nodules are also found in the Atlantic Ocean; however, it has been found that generally these nodules contain lower amounts of the more valuable metals and correspondingly high amounts of the less desirable metals which cannot be readily refined and which have little or no value; such as the alkaline earth metals.

Because of the peculiar and intricate crystal structure of the ocean floor nodules, the common refining techniques used for the refining of land ores are not generally suitable for the nodules.

Mero in U.S. Pat. No. 3,169,856 discloses a scheme for "separating the nickel from the cobalt in ocean floor ore deposit." The Mero process is directed to a specific type of ocean floor nodule ore wherein the separate mineral phases of manganese and iron contain different metal constituents. Specifically, according to Mero nickel and copper are present only in the manganese phase of the material whereas cobalt is present solely in the iron phase. Mero further states that the oxides are in solid solution within the nodule. Mero reacts the nodule ore with a strong reducing agent for example, $SO_2$ or $NO_2$.

The Mero process is based upon the unique relationship of the metal constituents in being sub-divided between the manganese and iron phases. Mero states that as a result of the phase differences in the nodule ores, it is possible to carry out a process for differentially leaching these materials from the ore. In a first stage, the ore is contacted with an aqueous solution comprising $SO_2$ or $NO_2$ to selectively leach out manganese, nickel, copper and other mineral elements bound up in the manganese phase of the ore. The cobalt and iron are not leached out. The first solution containing the manganese, nickel and other elements is then treated by various chemical means to separate the different metal values.

In the processing of various land based ores, it has also been known to leach out from the ore the desired meal values, for example, nickel and cobalt. The ore is generally first ground and sometimes, in addition, treated chemically, as by reductive roasting. The ore is then leached with a highly concentrated aqueous ammonia and $CO_2$ solution. See for example, the Caron patent, No. 1,487,145 which is cited in U.S. Pat. 2,913,336 to Dean and the U.S. Pats. to Schaufelberger, Nos. 2,711,956–7, and to Bare et al.: 2,879,137.

As pointed out above, the ocean floor nodules have a rather unique physical structure and chemical composition, especially including the fact that the primary metal value present in the most valuable nodule ores is manganese. It is thus desirable to separate out the manganese metal value from the other desired metal values as early in the refining process as possible; this early removal results in the low-cost manganese recovery, with a minimum of refining steps, while at the same time by removing the manganese from the other metal values before they are being processed, removes a possibly interfering metal ion from the system.

In accordance with the present invention an improved novel process is provided for extracting the individual metal values from an ocean floor nodule ore. The process comprises (1) reacting in the absence of oxygen nodule ore with an acidic reducing agent, which is capable of forming the corresponding water-soluble salt of divalent manganese from any oxide of tetravalent manganese present in the ore, but which will not react with the oxidic compounds of nickel, copper and cobalt, in the absence of oxygen; (2) leaching the reacted ore with water to form an aqueous solution of the water-soluble manganese salt; (3) separating the aqueous solution of manganese salt from the remaining solid residue of the ore; (4) contacting the solid residue of the ore with a salt-forming reagent so as to form the corresponding water-soluble salts of nickel, copper and cobalt; (5) releaching the re-reacted ore to form an aqueous solution of the metal salts of copper, nickel and cobalt, and separating the aqueous solution from the solid ore residue and from the iron compound.

The aqueous solution which is thus formed, comprising the metal values of the ore, except for the major part of the manganese and substantially all of the iron, can be further treated to separate the individual metal values of nickel, copper and cobalt into separate streams. The separated metal values can then be reduced to the elemental metals, as by electrolysis.

Steps (4) and (5) can be carried out concurrently when the salt-forming reagent is present in solution or the reaction is carried out in an aqueous medium.

The events in step (5) above can be carried out simultaneously or in chronological sequence. Encompassed within this step are processes wherein a solution of all the metal values, including those of iron, cobalt, nickel and copper are dissolved in water and the iron is then removed from the solution; also encompassed within this step are processes wherein the iron is first converted to a water-insolule material, e.g., iron oxide, before leaching with water, the remaining metals dissolved in water and the solution separated from the insoluble iron material. If an aqueous solution is formed which contains any dissolved iron, the iron can be removed by a variety of means including (1) increasing the pH of the solution of above 3 and passing oxygen therethrough to precipitate the iron as iron oxide; (2) extracting the iron solute, as by liquid extraction, or (3) drying the solution and then converting the iron salt to iron oxide at elevated temperatures above 200° C. in the presence of water. The iron-free aqueous solution of the metal values can be separated into the individual metal values, for example by liquid ion exchange.

The first stage of this process, reacting the ore with the reducing agent in the absence of oxygen, is a first-order reaction and thus proceeds at a relatively fast rate regardless of temperature, e.g., at ambient or higher. The procedure can be carried out, for example, at temperatures as low as −40° C., or at temperatures as high as 500° C. However, it is preferred to operate, if possible, at substantially ambient temperatures, e.g., at temperatures of from about 10° C. to about 90° C. and optimally of from about 15° C. to about 45° C.

The reacted ore can then be leached with water, after it has been removed from the reaction medium; the water preferably has a pH of not greater than about 3 and most preferably not greater than about 2. The leaching with the water can be carried out also at substantially ambient temperatures with the preferred range being at temperatures of from about 0° C., i.e., above freezing, to about 90° C., i.e., below boiling and most preferably from about 10 to about 45° C.

The reacted ore, following leaching, is substantially free of tetravalent manganese. There may be a relatively small portion of divalent manganese present in the ore, plus the other metal values, e.g., nickel, cobalt and copper. The ore can then be treated in a variety of ways so as to separate the remaining valuable metal values from the ore. The ore can be reacted with substantially any acidic medium, i.e., any medium which would react with the insoluble oxidic metal compounds in the ore to form product compounds of the metal values which are readily separated from the gangue, or detritus, of the ore. Such product compounds are water-soluble, and thus can be separated from the residual ore material by aqueous leaching.

For example, the leached ore can be next treated with a source of halide ion, especially of chloride, bromide or iodide, such as a hydrogen halide, to form the water-soluble halides of cobalt, copper and nickel. Such halides can be separated from the reaction mixture by leaching with an aqueous liquid. The reaction can be carried out, for example, using vaporous hydrogen halide or an aqueous solution of hydrogen halide at a wide range of temperatures. For a more complete description of these procedures, see German published specification No. 2,126,175 and unpublished German application Ser. No. 2,247,629, filed Sept. 28, 1972.

Another procedure for reacting the ocean floor nodule ores results in the formation of the sulfates of the metal values. For example, by reacting the leached ore with sulfur dioxide, in the presence of oxygen, the sulfates of the nickel, copper and cobalt values are formed. The reaction with the sulfur dioxide can be carried out in an aqueous medium, in which case the water-soluble salts of nickel, copper and cobalt are immediately formed and dissolve in the aqueous reaction medium, whereas the presence of excess oxygen prevents the formation of any soluble iron salt and thus the dissolution of any substantial amount of the iron into the aqueous solution. The aqueous solution can be separated from the solid ore residue, including the iron. See German published specification No. 2,126,222.

As another alternative, the leached ore can be contacted with an ammoniated solution comprising dissolved ammonia and a strongly negative, stable, soluble anion. The solution should be sufficiently concentrated in ammonia to permit the formation of metal-ammonia complexes of the nickel, cobalt and copper, but also sufficiently concentrated in the anion to prevent the formation of a complex including the hydroxyl anion.

The releach solution contains the metal values of nickel, cobalt, and copper from the nodule ore plus trace quantities of the other metal values which are present in the ore. There may sometimes be some manganese removed at this stage.

The releaching of the nodule ore when utilizing sulfur dioxide as the salt-forming reagent can be carried out at substantially ambient temperatures. The preferred range of operating temperatures is from about 10° to about 75° C. and the most preferred temperatures are in the range of from about 20° to about 50° C. Although higher and lower temperatures can be utilized when the reaction is between the ore and an anhydrous material, much higher or much lower temperatures have been found to be unnecessary and, therefore, uneconomical, based on the cost of cooling or heating the reagents.

Generally, sufficient leach and releach solution should be fed to the ore so as to form a solution which is less than saturated in the desired metal values.

The nodule ore is preferably comminuted, as by grinding, crushing or pulverizing, into small particles, preferably not greater than about 10 mesh on the U.S. sieve scale, and most preferably in the range of from about 35 to about 100 mesh. This tends to increase the surface area for reaction and, therefore, is desirable in improving the rate of the reactions. When carrying out the reaction in an aqueous medium, the comminuted ore is preferably slurried in the water and slurry is then contacted with the reagent; for example, if a gas such as sulfur dioxide is used, the gas is bubbled through the slurry.

The first leach solution is a substantially pure aqueous solution of a manganese salt and thus can be directly treated to obtain elemental manganese metal. The manganese metal can be obtained by electrolysis of the aqueous solution directly.

The second or releach solution, however, is a solution of a mixture of at least the three secondary metal values of the ore, i.e., nickel, copper, and cobalt, plus traces of the other metal values present in the ore. This is a rather complex aqueous solution; as a result many of the standard hydrometallurgical methods for separating metal values are not directly applicable because of the various interfering ions. Preferably, the following procedures can be utilized for separating at least pure cobalt, copper and nickel from the pregnant releach solution.

For separating each of the copper, cobalt, and nickel values from the releach solution a liquid extraction procedure is most preferred.

The liquid-liquid extraction procedure requires the use of an extracting medium which is readily separable from water, which is selective for extracting one or more of the metal values from the aqueous leach solution and from which the metal value can be readily stripped.

The extracting medium should be immiscible with water to improve the economic efficiency of the process. If the extracting medium were not immiscible with water, a substantial loss of the extracting reagent would occur during each extraction, by virtue of at least a partial solubility in the water phase and a loss of the extracting agent in the aqueous raffinate.

Extracting agents which are especially suitable because they are highly specific to the metal values in the leach solutions which are obtained, e.g. from ocean floor nodule ores, include, for example, certain substituted 8-hydroxyquinolines, α-hydroxy oximes and naphthenic acids.

The 8-hydroxyquinoline compounds, which are especially useful for the separation of the metal values in accordance with the present process, can generally be defined by the following formula:

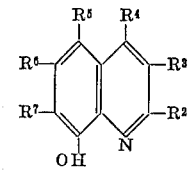

wherein each of the R groups can be hydrogen or a hydrocarbyl group or inertly-substituted hydrocarbon groups, such as alkenyl, alkyl, alkynyl, cycloalkyl, cycloalkenyl, aryl or combinations thereof, such as alkaryl, aralkyl, aralkenyl, alkyl-cycloalkyl, etc.

At least one of the R Groups, however, must be a hydrocarbon group. Any inert substituent can be present as long as it does not adversely affect the solubility of the substituted 8-hydroxyquinolines in organic solvents nor adversely affect the solubility in the organic solvent of the metal chelate formed therefrom.

The resulting metal chelate must remain soluble at least to the extent of approximately 2% by weight in the organic solvent.

The preferred position of the hydrocarbyl substituent of the 8-hydroxyquinoline nuclear structure is such as to preferentially complex with the desired metal ion in the aqueous solution. The sum of the carbon atoms in the R groups must be at least about 8 and can be high as 24 or more. The preferred R groups are alkylbenzyl groups or beta-alkenyl groups containing from 12 to 18 carbon atoms, preferably attached at the $R^5$, $R^6$, or $R^7$ position. The optimum position for the substitution is at the $R^7$ position to obtain the highest degree of efficiency. For a more complete description of these hydrocarbyl-substituted 8-hydroxyquinolines, see Republic of South Africa specification No. 69/4,397 to Budde Jr. et al., assigned to Ashland Oil, Inc.

Representative compounds useful for ion exchange and within the scope of the above General Formula I are: 7 - octyl-benzyl - 8 - hydroxyquinoline, 7-dodecyl-benzyl-8-hydroxyquinoline, 7 - nonylbenzyl-8-hydroxyquinoline, 7-ditertiarybutyl-benzyl - 8 - hydroxyquinoline, 7 - hexadecenyl-8-hydroxyquinoline, 7 - dibenzyl-8-hydroxyquinoline, 7-dimethyldicyclopentadienyl - 8 - hydroxyquinoline, 7-phenyl-dodecenyl-8-hydroxyquinoline, and the like where one or more of the hydrocarbyl groups R are attached to ring carbon atoms in the 2nd, 3rd, 4th, 5th and 6th positions. Mixtures of these 8-hydroxyquinoline derivatives can be used if desired.

The second preferred type of metal extractants are the alpha-hydroxy oximes, which are disclosed inter alia in U.S. Pats. Nos. 3,224,873; 3,276,863 and 3,479,378. These materials have the general formula:

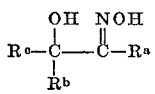

wherein the $R^a$, $R^b$ and $R^c$ groups can be any of a variety of organic, hydrocarbon radicals such as aliphatic and alkyl aryl radicals. $R^b$ can also be hydrogen. Preferably $R^a$ and $R^c$ are unsaturated hydrocarbon or branched chain alkyl groups containing from about 6 to about 20 carbon atoms. $R^a$ and $R^c$ are also preferably the same, but when alkyl are preferably linked to the central carbon atoms by a secondary carbon atom. $R^b$ is preferably hydrogen or unsaturated hydrocarbon or branched chain alkyl group containing from about 6 to about 20 carbon atoms. The oxime preferably contains a total of from about 14 to about 40 carbon atoms. Useful $R^a$, $R^b$ and $R^c$ groups include in addition to hydrogen, the mono- and polyunsaturated groups such as heptenyl, octenyl, decenyl, octadecenyl, octadecynyl, and 2-ethyl-octadecenyl.

Alkyl groups include 2-ethylhexyl, 2,3-diethylheptyl, 2-butyldecyl, 2 - butylhexadecyl, 2,4 - ethylbutyldodecyl, 4-butylcyclohexyl, and the like. Examples of the preferred alpha-hydroxy oximes include 19-hydroxyhexatriaconta-9,28-dien-18-oxime; 5,10-diethyl - 8 - hydroxytetradecan-7-oxime; 5,8-diethyl-7-hydroxydodecane-6-oxime.

The liquid ion exchange agents, which are used for the extraction of copper, cobalt and nickel values are generally chelates and thus remove only the metal values from the solution, leaving behind the anions.

The above hydroxyquinolines and oximes are compounds generally known to industry and commercially available. Any other compounds useful as selective extractants for the metal values in the aqueous systems obtained from the reduction of ocean floor nodules ores can also be used in the process of this invention.

The extracting agent can be a liquid which is itself water-immiscible but generally can be dissolved in a solvent which is substantially immiscible with water. The oximes and hydroxyquinolines are at least partially insoluble in water. It has been found to be preferable to use them in solution in a water-immiscible solvent to form a water-immiscible extraction medium to prevent loss of the extraction agent in the aqueous raffinate.

It has been found when utilizing common commercially available water-immiscible solvents that solutions containing from about 2 to about 50 percent and preferably from about 5 to about 30 percent by wt. of the extracting agent is economically useful as being sufficiently active to remove the desired metal values selectively from the aqueous solution and being sufficiently dilute in the extracting agent so that substantially no extracting agent is leached out and lost in the aqueous raffinate. If it is desired, however, more concentrated solutions can be utilized. Mixtures of extracting agents can be used as long as they are not jointly reactive and do not interfere with the process of this invention.

Useful solvents include generally any inert hydrocarbons which are solvents for the extracting agent, per se. and for the metal chelate, or extracting agent-metal complex, and which do not react with any of the other materials present, under the conditions of the extraction process. Generally, liquid aliphatic, cycloaliphatic, aromatic, cycloaliphatic-aromatic, aliphatic-aromatic or chlorinated such hydrocarbons are preferably utilized as the solvent-diluent for the extracting agent. Optimally, the diluent-solvent has a specific gravity in the range of from about 0.65 to about 0.95 and a mid-boiling point in the range of from about 120 to about 615° F. (ASTM distillation).

However, substantially any liquid can be used as a solvent-diluent that meets the following criteria:

(1) A solvent for the extracting agent;
(2) A solvent for the extracting agent-metal complex, or chelate;
(3) Immiscible with water; and
(4) Readily separable from water.

Examples of suitable solvents include benzene, toluene, xylene, aliphatic and aromatic petroleum fractions such as naphtha and derivatives thereof and the mixtures of the foregoing. In addition to the aliphatic, aromatic, cycloaliphatic-aromatic, aliphatic-aromatic hydrocarbons and cycloaliphatic hydrocarbons, chlorinated such hydrocarbon liquids can also be usefully utilized.

Light fuel oil, high flash point kerosene and other petroleum hydrocarbons, such as hexane-heptane mixtures are preferred. Generally, the aliphatic materials are most preferred because of their ready availability and ease of separation from the aqueous phase.

The concentration of the extracting agent in the solvent-diluent is determined not only by the solubility of the extracting agent per se, but also by the solubility of the extracting agent-metal complex, or chelate.

In addition to the diluent and the extracting agent, there can preferably also be present in the liquid extracting medium a phase modifier which prevents formation of an emulsion with, or entrainment of, the organic phase in the aqueous phase. This is accomplished, it is believed, by altering the surface tension and related physical properties of the organic-aqueous mixture during extraction. These phase modifiers are generally most useful when an aliphatic solvent-diluent is utilized and include, preferably, aliphatic alcohols containing from about 8 to about 16 carbon atoms such as n-octyl alcohol, n-decyl alcohol, n-dodecyl alcohol, n-tetradecyl alcohol, n-hexadecyl alcohol, isooctyl alcohol, 2-ethylhexyl alcohol, cyclohexanol and mixtures of these and other alcohols. Decanol is a preferred material.

Generally no more than the necessary amount of the phase modifier, e.g., alcohol, which is necessary to inhibit the formation of the emulsion or prevent entrainment, should be used. Usually no more than about 25% by volume of the phase modifiers is necessary. Preferably, from about 2 to about 10% by volume is satisfactory and not more than about 5% is most preferred. The phase modifier can be completely eliminated if desired, and, therefore, is optional in the present procedure.

The present invention does not comprise solely the selection of the extracting medium. It is preferred that the extracting medium be a liquid, because liquid-liquid extraction of a normally solid material from solution is a relatively simple and common procedure. However, other extraction procedures can be followed and other types of extractants used.

When utilizing liquid-liquid extraction from an aqueous solution of mixed metal halides, a wide range of aqueous phase-to-aqueous-immiscible-phase volume ratios can be utilized in the present invention. Generally, using a 20% by wt. solution of the extracting agent, aqueous-to-aqueous-immiscible phase volume ratios of from about 10:1 to about 1:10 are desirable. The useful range of volume ratios differ proportionately for other concentrations of the extracting agent.

The above two types of extraction agents are especially preferred for the separation of the metal values found in the leach liquid obtained from ocean floor nodules because it has been discovered, as an aspect of this invention, that a single one of these reagents can be utilized for the selective removal of all of the important metal values from the leach liquid. Thus, by utilizing either an α-hydroxy oxime or an 8-hydroxyquinoline, a single extracting medium can be utilized for removing, in seriatim, all of the desired metal values. It is unnecessary to utilize a multiple extractant system when utilizing these materials, but is merely necessary to vary the pH of the leach solution following each successive extraction.

Beginning with a pregnant leach solution containing dissolved copper salt, cobalt salt, nickel salt and manganese salt, as the primary solutes, plus a variety of other metal salts in minor concentrations, the extraction of the individual metals can preferably by carried out by the following general procedure with liquid ion exchange agents: (1) adjust the pH of the pregnant leach solution to a desirable pH; (2) mix the pregnant leach solution with an immiscible organic liquid containing an extractant specific to a metal at that pH; preferably, copper is extracted with an $\alpha$-hydroxyoxime or 8-hydroxyquinoline initially at a pH of not greater than about 2.5, preferably from about 1.5 to about 2.5 and optimally of from about 1.8 to 2.2: the best results are obtained at a pH of about 2; (3) separate the aqueous raffinate from step (2), adjust the pH as necessary, mix the raffinate with an immiscible organic liquid containing an extractant specific to another metal at the pH of the aqueous phase. Generally, nickel can be extracted using, for example, an $\alpha$-hydroxyoxime or 8-hydroxyquinoline at a pH of from about 3 to about 6 and preferably about 3 to about 3.5 with chelating, or liquid ion exchange agents, and cobalt can be extracted at a pH of from about 3.5 to about 7, preferably from about 6, optimally from 3.5 to about 5 and the most economical results at from 3.5 to about 4.5. At too high a pH, the manganese, nickel and cobalt tend to precipitate and this is preferably avoided. Further, increasing pH too much is expensive, in using up basic reagents. Nickel and cobalt can be extracted together.

The ratio of cobalt and nickel removed from the pregnant leach solution by the extractant is determined by the pH, and by the volume phase ratio of organic-to-aqueous phases, i.e., the relative proportions of nickel and cobalt can be the same as that which is present in the pregnant leach solution or it can have a greater proportion of nickel or a greater proportion of cobalt. Generally, the higher the pH the greater the proportion of cobalt extracted. It is preferred, usually, to remove the nickel and cobalt in the same proportions as the metals are present in the pregnant leach solution. Therefore, the pH for this ratio should be maintained during the extraction.

It is usually necessary to continually add alkaline material during the extraction stages in order to maintain the desired pH. The chelating agents act by releasing hydrogen ions when extracting metals, and thus the pH would decrease during extraction. Caustic soda solution is preferably used. The sodium ion generally does not interfere with the further processing of any metal salt. However, other useful basic materials include generally the oxides, hydroxides and carbonates of alkali metals and alkaline earth metals. Such compounds include potassium hydroxide, lithium hydroxide, lithium carbonate and ammonium hydroxide and carbonate. Manganese hydroxide and manganese carbonate are especially useful as they do not introduce any additional metal value. Buffering agents can also be added; however, this can add an undesirable impurity to the leach liquid.

Each extraction step can be carried out with one or more extraction stages until the desired amount of metal is extracted.

(4) The metal-containing organic extractant phases can be stripped of the metal values by contacting with aqueous stripping solution; generally an acidic solution is used. Generally, following stripping the extracting solution can be recycled to the process.

Copper can be readily stripped by any aqueous mineral acid. The amount of hydrogen ion provided by the stripping liquid must be at least slightly in excess (preferably at least about 5% in excess) of the stoichiometric amount needed to substitute for the metal in the extract. Preferably, the stripped copper is soluble in the stripping liquid. The preferred stripping acids include sulfuric acid, nitric acid, and hydrochloric acid. As the acid used determines the metal salt to be formed, this can be a basis for selecting the acid, if a particular salt is desired.

Where nickel and cobalt are extracted together, the nickel can first be stripped using a relatively weakly acidic aqueous solution, such as the mineral acids or the stronger organic acids, such as chloracetic acid, in a concentration of less than about 6 N, preferably from about 0.01 N to about 3 N acid and most preferably from about 0.1 N to 1.0 N. Cobalt can then be stripped from the chelate using a strong mineral acid aqueous solution in a concentration of at least 6 N hydrogen ion and 6 N chloride ion. Strong hydrochloric acid, containing at least about 20% by weight HCl is preferred.

Although the strong acid-chloride solution of cobalt can be directly used for the further reduction to cobalt metal, as in an aqueous electrolysis cell, it is preferred to extract the cobalt and then strip again to permit recycling and further use of the relatively expensive, strong, 6 N acid-chloride solution. This can be done by contacting the cobalt solution with a tri-alkyl amine, or other material capable of extracting cobalt from an aqueous solution. The amine is preferably dissolved in a water immiscible solvent to form a solution of the type described above for use with the hydroxyquinolines and oximes.

The tri-alkyl amine solution forms a complex with the cobalt halides and can then be readily separated from the strong acid solution. The cobalt halide can be stripped from the extractant by a weakly acidic aqueous solution, i.e., a pH of not greater than about 3, which can then be used, for example, as an aqueous electrolyte for refining to the elemental metal by cathodic electroplating.

The aqueous raffinate leach solution remaining after the cobalt and nickel are removed contains e.g. any manganese value which was releached from the nodule plus minor amounts of the salts of other metals.

The solutions of the individual metal salts can then be treated in a conventional manner to reduce them to the elemental metals, e.g., by cathodic electroplating techniques. For example, manganese sulfate can be reduced to manganese in an aqueous electrolytic cell. Copper nickel, and cobalt salts can be reduced to the metal from aqueous solutions in electrolytic cells.

The electrolytic procedures include the conventional methods for electrolytically reducing the salts to the elemental metals and the exact procedure forms no part of this invention. However, preferably, aqueous electrolysis procedures are followed wherein the electrolysis solution can be utilized in stripping the metal value from the liquid ion exchange medium and then can be reused directly, with or without preliminary treatment, in the electrolysis, so as to continuously replenish the supply of electrolyte salt.

It should be noted that under this procedure the electrolyte salt, which is obtained from the liquid ion exchange medium, need not be the original salt produced in the salt-forming reaction.

Generally, it has been found that the halides are especially effective as electrolyte solutes producing an elemental halogen, e.g., chlorine, in addition to the elemental metal.

Regardless of which salt is formed during the reaction between the nodule ore and the acidic medium when the metal values are stripped from the liquid ion exchange medium, the salt formed depends upon the acid which is used for the stripping.

For a more complete explanation and description of various electrolysis, or cathodic electroplating, refining procedures, see, Graham Electroplating and Engineering Handbook (1971), for example.

The above liquid ion exchange procedures and electrolysis procedures are not applicable when the ore is releached with a solution of ammonia and a negative anion.

The drawing is a schematic flow diagram showing the process of the present invention utilizing a sulfur dioxide solution as the releach liquid.

Referring to the drawing the nodule ore is first crushed and ground to a particle size of not greater than about 35 mesh, U.S. sieve scale, and passed into a fluidized bed where it is contacted with sulfur dioxide gas; the flow rate of gas is sufficient to maintain a fluidized bed of the nodule ore. Air is excluded from this reactor. The reactor having been flushed to remove air before any ore is fed. The ore is continuously fed to the fluidized bed, downwardly, countercurrently to the upward flow of $SO_2$ gas, and reacted ore is continuously removed from the fluidized bed and passed into a two-stage, mixer-settler leach tank countercurrently to water having a pH of not greater than about 5. The slurry from the final stage of the leach tank passes into the filter to separate the aqueous solution from all solid residue. The aqueous solution of manganese sulfate is then passed to an electrolytic cell to reduce the manganese sulfate to manganese metal.

The solid residue is then passed to a second leach tank where it is mixed to form a slurry with water and then is contacted with additional $SO_2$ gas mixed with air. The flow of $SO_2$ and air should be at least sufficient to react with all of the metal value in the residue slurried in the leach tank. Air is present in excess to provide an oxidizing atmosphere.

The sulfate salts of the metal values in the ore are formed in accordance with the following equations:

$$2NiO + 2SO_2 + O_2 \rightarrow 2NiSO_4$$
$$2CoO + 2SO_2 + O_2 \rightarrow 2CoSO_4$$
$$2CuO + 2SO_2 + O_2 \rightarrow 2CuSO_4$$

The slurry of reacted ore is passed to a filter and the filtrate from the filter is then passed to a liquid ion exchange system in which the copper, nickel and cobalt metal values are removed in that order from the aqueous solution.

The following example shows a preferred embodiment of the process of the present invention, but is merely exemplary and should not be considered exclusive of the full scope of the invention.

Ocean floor nodule ore having the following composition was obtained.

| Component: | Percent by wt. |
|---|---|
| Manganese | 17.65 |
| Iron | 10.6 |
| Nickel | 0.65 |
| Cobalt | 0.32 |
| Copper | 0.12 |
| Other metals | Traces |

Referring to the drawing, the nodule ore is ground to an average particle size of less than 100 mesh.

The comminuted ore is passed into a reaction vessel where it is maintained in a fluidized condition by an upwardly flowing stream of gaseous $SO_2$. The reactor is initially at a temperature of about 25° and at ambient pressure.

At start up, the vessel was first bled free of all air, and other oxygen-containing gases, utilizing nitrogen gas, prior to addition of the first $SO_2$ gas. The positive pressure in the reactor vessel also serves to prevent any leakage of air into the first system. The flow of $SO_2$ is substantially pure $SO_2$ gas.

The temperature of the bed increases during the process to about 100° C. The reacted nodule ore is then passed to a leach tank where it is contacted with water having a pH not greater than 5 in three mixer-settler stages; the overflow liquid from the final settling stage is then passed to a drum filter where any remaining solid residue is removed. The filtrate, which is substantially an aqueous solution of pure manganese sulfate ($MnSO_4$), is passed to an electrolytic cell to reduce the manganese sulfate to elemental manganese metal.

The solid residues from the final settling tank and from the drum filter are combined and mixed with approximately twice its weight of water into which is passed a mixture of air and sulfur dioxide. The total composition of the gas is approximately 10% $SO_2$, 15% oxygen. The mixture of reacted ore and water is then permitted to settle and the aqueous solution is decanted off and passed to a drum filter to remove any remaining residue. The liquid filtrate, comprises an aqueous solution of nickel sulfate, cobalt sulfate, copper sulfate and manganese sulfate. It was found that the proportion of nickel, cobalt, copper and manganese in this solution, combined with the manganese removed in the first stage of the process, was substantially 98% of these metal values in the original ore. There was substantially no iron found in the aqueous solution. The solid residue separated from the aqueous releach solution following treatment with $SO_2$ and oxygen contained the solid ore residue, or gangue, which is primarily calcium compounds, and the iron, generally as iron oxide.

The aqueous releach solution of the metal sulfates was then treated with a liquid ion exchange medium to remove the individual metal values of copper, nickel and cobalt from the remaining manganese as follows:

The releach solution contains manganese sulfate, copper sulfate, nickel sulfate and cobalt sulfate in solution. This material was extracted utilizing a solution comprising 10% by volume on an alpha-hydroxyoxime (5,8-diethyl-7-hydroxy dodecane-6-oxime, known as LIX-64N), 20% by volume isodecanol, and the balance a mixed hydrocarbon solvent, comprising mixed aromatic-aliphatic petroleum hydrocarbons having a boiling point range of 410–460° F., and a specific gravity of 0.81. The aqueous raffinate had its pH adjusted to about 2. The pH was maintained at about 2 by the addition of caustic during the extraction of copper. The aqueous raffinate and organic extractant passed countercurrently through five mixer-settler stages at an organic-to-aqueous ratio of 5:1 by volume. The aqueous raffinate from the copper extraction contained substantially all of the manganese, nickel, and cobalt originally present in the releach solution, but substantially all of the copper had been extracted.

Following the separation from the final settling stage, the organic extract was stripped of copper by spent acid solution from a copper aqueous electrolysis cell having a hydrogen ion concentration of 3 N, in $H_2SO_4$ utilizing countercurrent flow through 5 stages of a mixer-settler series.

The aqueous raffinate from the copper extraction step was adjusted to a pH of about 4.5 by the addition of 2 N caustic solution. The resulting aqueous solution was extracted in a five-stage mixer-settler system, with a solution of 10% by volume 7 - (3 - (5,5,7,7 - tetramethyl-1-octenyl)) - 8 - hydroxyquinoline plus 20% by volume isodecanol in kerosene to extract nickel and cobalt.

The nickel was stripped from the organic extract phase using the spent solution from a nickel electrolysis cell to which sulfuric acid was added to a concentration of hydrogen ion of 3 N in order to insure stripping of all of the nickel. The organic liquid and stripping acid were passed countercurrently through 3 mixer-settler stages at an organic-to-aqueous liquid ratio of 3:1, by volume. Substantially all of the nickel was removed from the organic phase.

The cobalt was next stripped from organic extract phase utilizing an aqueous solution containing 20% by wt. HCl, in four mixer-settler stages at an organic aqueous ratio of 3:1. The cobalt was extracted from the 20% HCl solution using a kerosene solution containing 10% by volume triisooctyl amine (TIOA), in three mixer-settler stages at an organic:aqueous volume ratio of 2:1. The cobalt was stripped from the TIOA solution utilizing spent aqueous electrolyte from a cobalt electrolysis cell in 3 mixer-settler stages with a 1:2 organic:aqueous phase ratio.

There were thus obtained, as a result of this process four separate final streams each containing substantially pure metal salt: copper sulfate, nickel sulfate, cobalt chloride and manganese sulfate. Each of these aqueous solutions could be further treated by known methods to reduce the salts to the respective elemental metal.

Manganese sulfate is preferentially reduced in an aqueous electrolytic cell. The copper, nickel and cobalt salts are preferably electrolyzed in aqueous electrolytic cells.

The patentable embodiments of this invention which are claimed are as follows:

1. A process for the separation of metal values from ocean floor nodule ores comprising primary quantities of the oxides of manganese and iron and secondary quantities of compounds of nickel, cobalt and copper; the process comprising
    (1) reacting the nodule ore with a first acidic reagent in the absence of oxygen to form a solid reacted residue comprising a water-soluble salt of manganese, the reagent being capable of reacting with the ore to form a water-soluble salt of manganese in the absence of oxygen but not capable of forming, in the absence of oxygen, a salt of nickel, copper and cobalt;
    (2) leaching the reacted ore with water to form an aqueous pregnant leach solution of the manganese salt;
    (3) separating the aqueous pregnant leach solution from a solid reacted ore residue;
    (4) treating the solid reacted ore residue with a second reagent to form water-soluble salts of nickel, copper and cobalt;
    (5) releaching the ore with water to form an aqueous pregnant releach solution comprising dissolved nickel, copper, and cobalt values;
    (6) separating the aqueous pregnant releach solution from any solid ore residue;
    (7) contacting the aqueous pregnant releach solution with a liquid ion exchange medium selective for one of the metal values, to form an aqueous raffinate free of the metal value and the exchange medium loaded with the metal value;
    (8) separating the liquid ion exchange medium containing the metal value from the aqueous raffinate solution;
    (9) stripping the metal value from the liquid ion exchange medium to form an aqueous solution of the metal value; and
    (10) electrolyzing the aqueous solution to reduce the metal value to the elemental metal.

2. The process of claim 1, wherein the first acidic reagent is $SO_2$.

3. The process of claim 1, wherein the second reagent is a mixture of $SO_2$ and air.

4. The process of claim 1, wherein the second reagent is a hydrogen halide and the water-soluble salts formed are the halides.

5. The process of claim 1, wherein the liquid ion exchange agent is selected from the group consisting of 8-hydroxyquinolines and alpha-hydroxyoximes.

6. The process of claim 1, wherein the nodule ore is initially comminuted to a particle size of not greater than about 10 mesh on the U.S. sieve scale.

7. The process of claim 1, wherein the first reagent is contacted with the ore in the absence of oxygen at a temperature in the range of from about 10° to about 90° C.

8. The process of claim 1, wherein the aqueous pregnant leach solution of manganese salt is electrolyzed to reduce the maganese value to manganese metal.

9. A process for the separation of metal values from ocean floor nodule ores comprising primary quantities of the oxides of manganese and iron and secondary quantities of compounds of nickel, cobalt and copper, the process comprising
    (1) contacting the nodule ore with an acidic reagent in the absence of oxygen to form a solid reacted residue comprising a water-soluble salt of manganese, the reagent being capable of reacting with the ore to form a water-soluble salt of manganese in the absence of oxygen but not capable of forming a salt of nickel, copper and cobalt in the absence of oxygen;
    (2) leaching the reacted ore with water to form an aqueous pregnant leach solution of the manganese salt;
    (3) separating the aqueous leach solution from the solid reacted ore residue;
    (4) treating the solid ore residue with a second reagent to form water-soluble salts of nickel, copper and cobalt;
    (5) releaching the ore with water to form an aqueous releach solution of salts of nickel, copper and cobalt; and
    (6) separating the aqueous releach solution from any solid ore residue.

10. The process of claim 9, wherein the acidic reagent and the second reagent are sulfur dioxide.

11. The process of claim 9, wherein the acidic reagent is sulfur dioxide.

12. A process for the separation of substantially pure manganese value from ocean floor nodule ores comprising primary quantities of the oxides of manganese and iron and secondary quantities of compounds of nickel, cobalt and copper, the process comprising
    (1) reacting the nodule ore with an acidic reagent in the absence of oxygen to form a solid reacted residue comprising a water-soluble salt of manganese, the reagent being capable of reacting with the ore to form a water-soluble salt of manganese in the absence of oxygen, but not capable of forming a salt of nickel, copper and cobalt in the absence of oxygen when reacted with the ore;
    (2) leaching the reacted ore with water to form an aqueous pregnant leach solution of the manganese salt;
    (3) separating the aqueous pregnant leach solution from the solid reacted ore residue.

13. The process of claim 12, comprising in addition, reducing the water-soluble salt to form manganese metal by cathodically reducing from the aqueous solution.

14. The process of claim 12, wherein the acidic reagent is sulfur dioxide.

References Cited

UNITED STATES PATENTS 3,169,856   2/1965   Mero _____ 75—119

JOHN H. MACK, Primary Examiner

R. L. ANDREWS, Assistant Examiner

U.S. Cl. X.R.

204—107, 113; 75—101 BE, 114, 117, 119, 121; 423—140